INVENTORS
ROBERT H. OVERCASHIER
ARTHUR L. FRICKE
BY:

*Martin S. Baer*

THEIR ATTORNEY

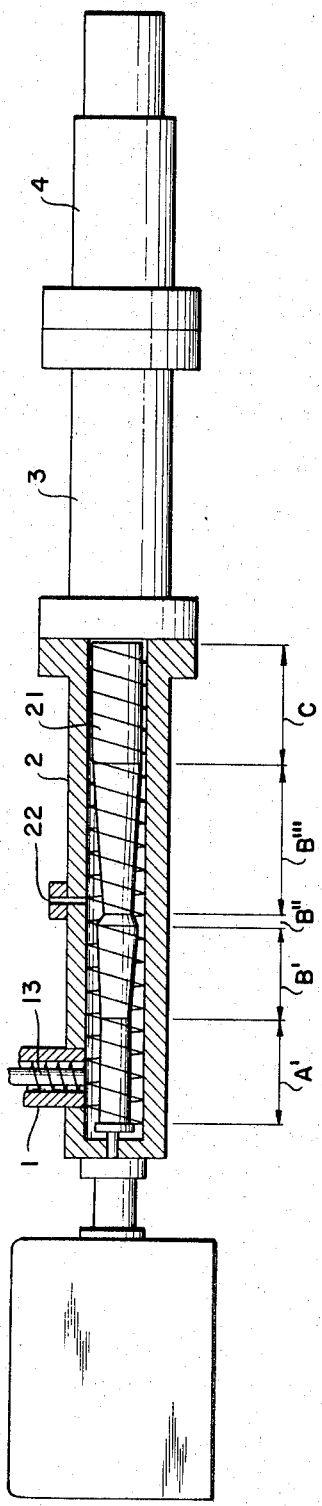

United States Patent Office 3,538,203
Patented Nov. 3, 1970

3,538,203
PRODUCTION OF EXPANDABLE AND
CELLULAR RESIN PRODUCTS
Robert H. Overcashier, Walnut Creek, Calif., and Arthur
L. Fricke, Blacksburg, Va., assignors to Shell Oil Company, New York, N.Y., a corporation of Delaware
Continuation-in-part of application Ser. No. 376,200,
June 18, 1964. This application July 10, 1968, Ser.
No. 743,812
Int. Cl. B29d 27/00
U.S. Cl. 264—53                                    6 Claims

ABSTRACT OF THE DISCLOSURE

An improved continuous method is provided for introducing volatilizable blowing agent into thermoplastic polymer compositions which are to be extruded as foamable mixtures from a screw extruder. The method comprises compacting finely divided polymer composition particles into a moving mass of solid particles having a void fraction in the range from 0.6 to 0.2 and introducing the blowing agent as a liquid or as a fluid in high-density, supercritical state into a said compacted mass. In one embodiment, the blowing agent is introduced at a point or points in the extruder at which the polymer mass has been partially decompressed after having been first compressed to the above-stated extent.

This application is a continuation-in-part of U.S. Ser. No. 376,200, filed June 18, 1964, now U.S. Pat. No. 3,407,151.

BACKGROUND OF THE INVENTION

This invention relates to an improvement in production of expandable and cellular thermoplastic materials and particularly crystalline polypropylene.

In U.S. Pat. 3,310,617 to Dygert et al., there is described a method for the production of foamed thermoplastic materials which, while having wide applicability, is particularly advantageous for production of foamed crystalline polypropylene. The method of said patent provides improvements in the dispersion of liquid volatile blowing agents in polymer melts and an improved process for the production of foamed thermoplastic material from such melts. The method is described specifically as it applies to batchwise preparation of mixtures of polymer with blowing agents. Apparatus suitable for the practice of the process is illustrated.

The preferred embodiment illustrated in the patent comprises introducing blowing agent into a mass of finely divided polymer particles in a mixing zone, such as a pressurized mixing vessel, establishing an equilibrium distribution in the mixing zone, then forcing the resulting mixture into the feed part of a screw extruder, converting it to a melt in the extruder, and extruding the melt through an appropriate die.

In copending application Ser. No. 376,200 of Overcashier et al., now U.S. Pat. No. 3,407,151, there is described a modification of the process of said patent in which disadvantages arising from use of a soluble volatile blowing agent with polypropylene in the production of expanded or expandable products are overcome by substituting for the polypropylenesoluble blowing agent an incompatible or insoluble volatile liquid.

The methods of said Dygert et al. and Overcashier et al. patents have in common that a volatilizable blowing agent is evenly distributed on a finely divided thermoplastic polymer composition and the mixture is thereafter compacted and melted under pressure, as in a screw extruder. In the embodiment described in detail in said patents this is achieved in a batch-type or semicontinuous operation in which a mixture of polymer and blowing agent is prepared in batches and then passed to a screw extruder for melting and extrusion.

Another method of preparing an extrudable melt of polymer and volatilizable blowing agent comprises feeding to an extruder pellets or beads of polymer which contain blowing agent incorporated therein, as described, for example, in U.S. 2,911,382 to Barkhuff et al., and U.S. 2,917,217 to Sisson.

Still another method comprises feeding volatile blowing agent into a zone of an extruder in which the polymer is present in melted condition. Such a method is described, for example, in U.S. 3,344,215 to DeWitz et al.

SUMMARY OF THE INVENTION

This invention provides an improved continuous method for producing melts of thermoplastic polymer composition and volatilizable fluid blowing agents and extruding the melts to produce foamed or foamable solid polymer articles.

According to this invention, a finely divided polymer composition is compressed by a continuously operating compressing means into a moving compact mass of solid particles; volatilizable fluid blowing is forced into said mass as a liquid or as a fluid in high-density, supercritical state at or beyond a stage of compression at which the void fraction of the mass has been reduced to a value in the range from 0.6 to 0.2; the mixture is then melted and extruded.

BRIEF DESCRIPTION OF THE DRAWING

In the drawing:

FIG. 3 is a diagrammatic view, in partial section, of another embodiment of apparatus suitable for practicing said method.

DESCRIPTION OF THE PREFERRED EMBODIMENT

Figure 1:
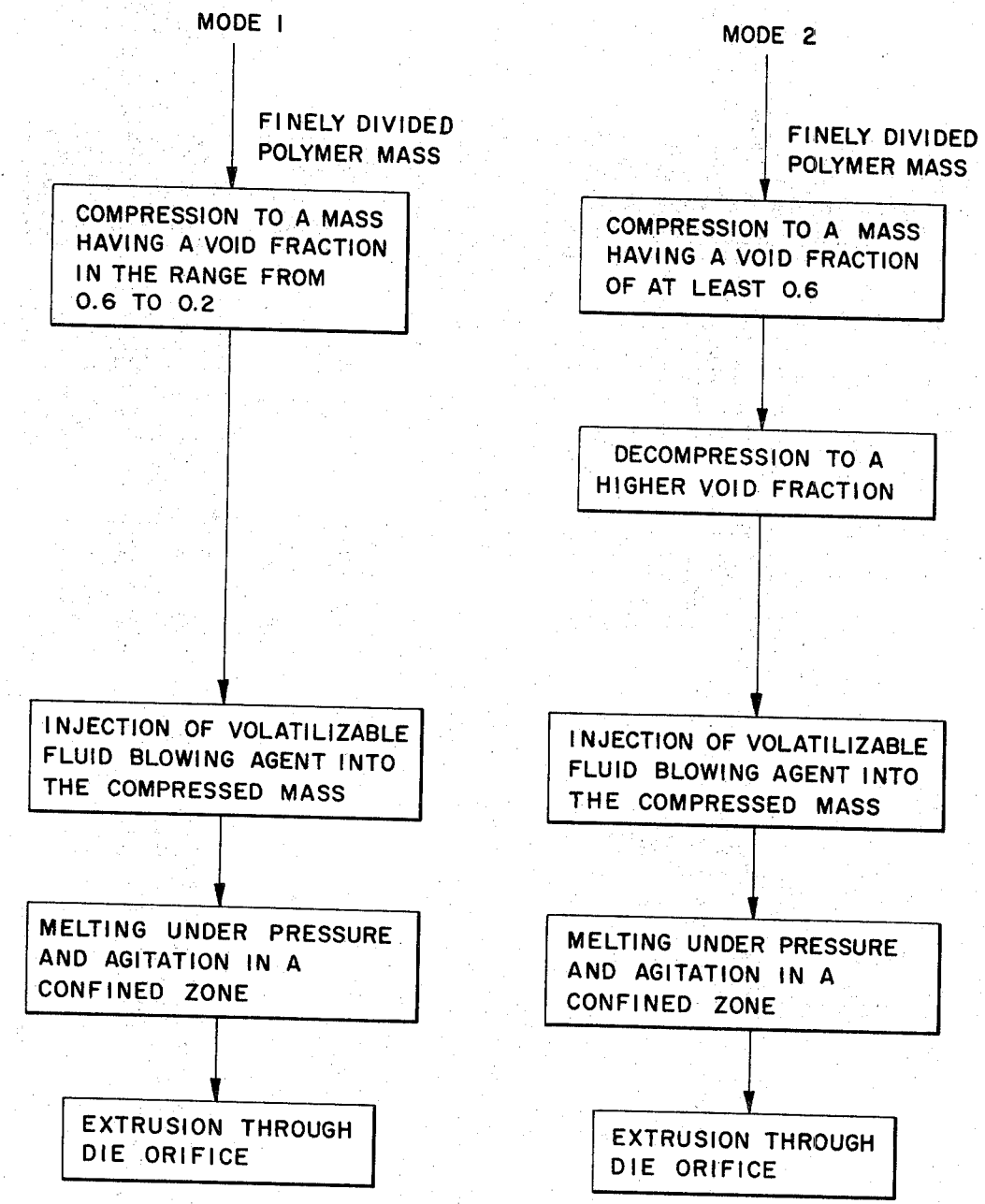
FIG. 1 is a flow scheme of two modes of practicing the method according to this invention.

FIG. 1 is a self-explanatory flow scheme of two alternative modes of practicing the method of this invention. It will be understood that the polymer mass moves continuously from one stage to the next.

Figure 2:
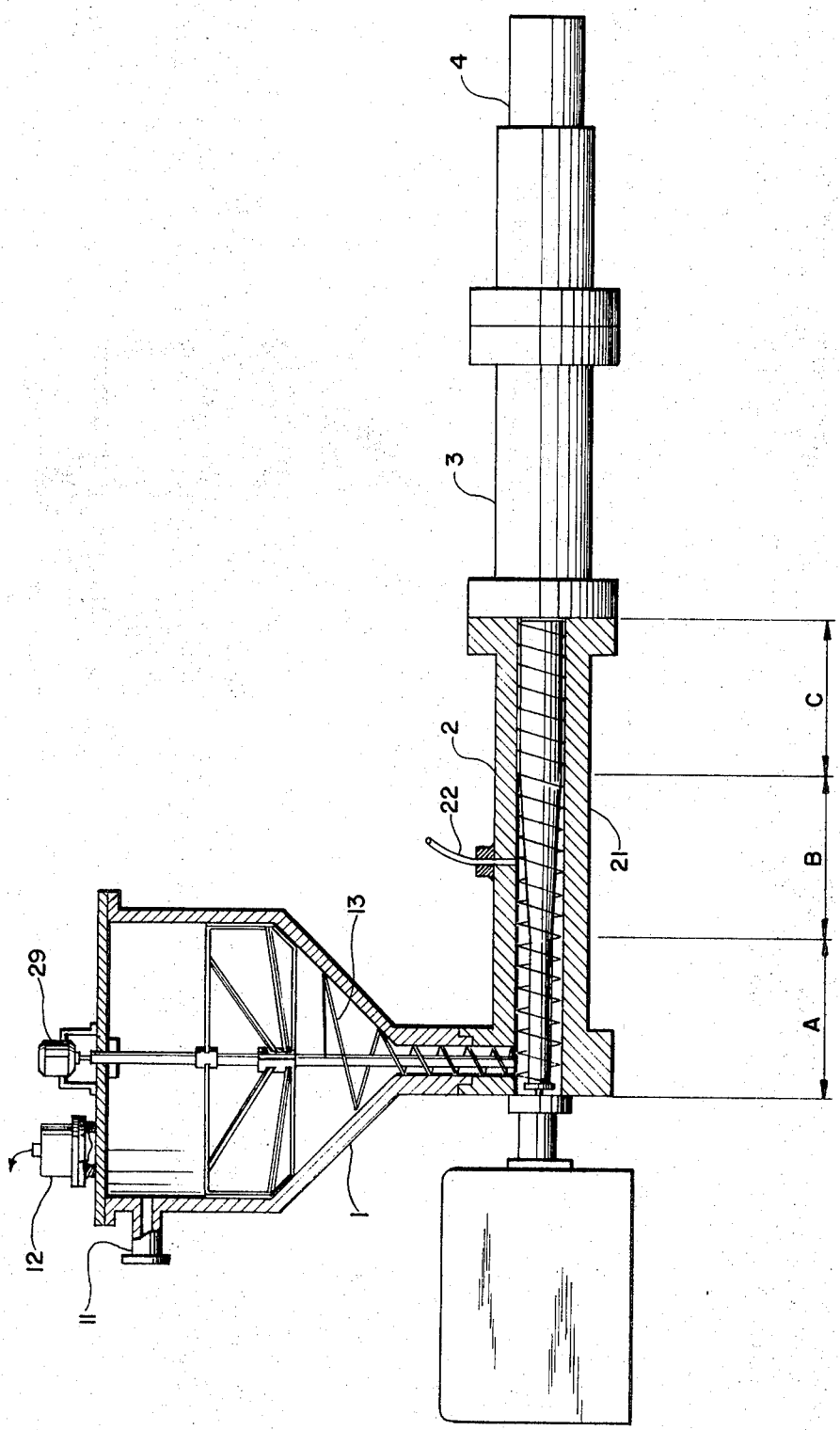
FIG. 2 is a diagrammatic view, in partial section, of one embodiment of apparatus suitable for practicing said method.

FIG. 2 illustrates how the present invention can be carried out in a modification of the apparatus illustrated in U.S. 3,310,617 to Dygert et al. The apparatus and a method of operating it are described in detail in said patent and will be described herein only briefly, together with the significant modifications.

The essential major parts of the apparatus are a device for continuously compressing and feeding finely divided polymer composition to a single-screw extruder. The extruder comprises a forwarding compression and metering section 2, heat exchange section 3 and extrusion die 4.

Powdered polymer composition is fed to feed hopper and crammer 1 through line 11, preferably in continuous manner. The powder may be carried by a stream of inert gas which can be withdrawn through filtered line 12. In the feed hopper the powder is gradually compacted and compressed and fed into the extruder by means of helically flighted screw 13. The operation of such a crammer feeder is described in greater detail in U.S. Pat. 3,183,533 to Slater.

The compacted powder mass entering the extruder is forwarded from the rear end of the extruder, at which it enters, to an extrusion die at the forward end of the extruder by means of helically flighted screw 21, which suitably has an initial forwarding section A of constant root diameter, a compression section B of increasing root diameter and a metering section C of constant, relatively large root diameter.

The powder mass entering the extruder from crammer 1 may be sufficiently compacted to have a void faction of 0.6 to 0.2. In that case, the blowing agent may be injected into the powder mass at a point in forwarding section A, downstream from the entry opening for the powder mass. If the mass is insufficiently compacted as it enters the extruder, blowing agent will be injected at a point in the compression section of the extruder at which the powder mass has been compacted to a void faction in the range from 0.6 to 0.2. In the drawing, injection of blowing agent through line 22 into the powder mass is shown at a point of at which some compaction has taken place in the compression section. Care must be taken to design the extruder and operate it in such a manner that the polymer mass has not been melted at the point at which the blowing agent is injected, but is still in the solid state. The degree to which the mass has been compressed in the extruder before blowing agent is injected is sufficient to prevent any substantial amount of blowing agent passing back through the mass and into the feed hopper.

The blowing agent is normally injected as a liquid under sufficient pressure to remain liquid when distributed in the polymer mass, which is at a temperature at which it remains in the solid state. In the case of fluids of relatively low critical temperature, the blowing agent may be in supercritical fluid state when injected, but it should have a density in excess of 1 pound per cubic foot at the temperature and pressure prevailing in the polymer mass at the point of injection.

Injection of blowing agent into the compacted solid mass having a void faction between 0.6 to 0.2 results in even distribution of the blowing agent in the voids in the mass of powder. As the mass is further forwarded in the extruder it is gradually melted by heat generated by friction of the screw together with heat which may be introduced into the mass through the barrel in known manner. The melted mixture passes through a metering section which assures a constant rate of blow of the melt to the die. In a preferred mode of operation, the melt is passed through a heat exchange device 3 to extrusion die orifice 4. The liquid melt of polymer composition containing volatilizable liquid blowing agent distributed therein is then extruded through the die. It may be extruded into the atmosphere or into a zone of superatmospheric pressure, e.g., in the manner described in said Dygert et al. and Overcashier et al. patents, to provide either a foamed polymer article or a foamable polymer article.

In the modification illustrated in FIG. 3 of the drawing, similar parts are designated by the same numerals as in FIG. 2. Feed hopper and crammer 1 may be identical to that of FIG. 1 and is not shown. The precompacted polymer powder is passed into feed forwarding section A' of the extruder. The powder is then forwarded into compression section B' in which it is compressed to a void faction in the range from 0.6 to 0.2. In order to permit addition of the volatilizable fluid blowing agent at a lower pressure than would be required if it were to be injected into the highly compressed mass, the powder mass then passes through a partial decompression stage B'' in which the pressure exerted on the mass is reduced due to a decrease in the root diameter of the screw. At this stage, volatilizable fluid blowing agent is injected through line 22 into the mass, which may have a void faction substantially higher than 0.2. The mass is then recompressed and converted to a liquid melt in compression section B''' and is metered through metering section C. The remainder of the operation is unchanged from that described for FIG. 2.

In the schematic representation of FIGS. 2 and 3, various apparatus aspects which will be apparent to persons skilled in the extruder art have not been illustrated. This includes, for example, suitable heating and cooling means, such as heat exchange jackets or electrical heating devices associated with the extruder barrel; pumping and metering devices for the blowing agent and appropriate instrumentation.

It will be evident that various modifications of the apparatus are within the skill of the art. For example, instead of providing for compression by means of a screw of constant pitch and increasing root diameter, as illustrated, the same effect can be achieved by a screw of constant root diameter and decreasing pitch. Instead of a single orifice for injection of blowing agent, several orifices spaced around the circumference of the barrel may be employed, although this is not generally required. To provide greater flexibility, several orifices spaced along the barrel may be provided, with valving means to permit the use of any one or more of them, as desired. The invention is not limited to practice in a single-screw extruder; a trim-screw extruder may be employed, for example.

In a commercial process for producing foamed polymer according to this invention, the rate at which blowing agent is desired to pass through the die orifice will be known for any given polymer flow rate. It is predetermined in accordance with the desired foam characteristics. The rate at which blowing agent leaks back to the uncompacted polymer mass can be determined by suitable instrumentation in several convenient ways. For example, if foam of predetermined density is made at constant extrusion conditions it will thereby be known that blowing agent is passing through the die at said predetermined rate. The blowing agent leakage loss rate is then determined as the difference between the measured rate at which blowing agent is charged and that at which it is known to pass through the die. Another method, applicable to the apparatus of FIGS. 2 and 3, comprises analyzing the stream of inert gas passing out of hopper 1 through filtered line 12 for blowing agent content and computing the rate of loss from this analysis and the measured stream flow rate.

In the operation of the process it is desired to reduce the loss of blowing agent. This can be done, for example, by monitoring the loss rate as just explained and then, if necessary, adjusting the operation of the feeder crammer to increase the amount of compression if the loss rate exceeds a desired value. In an extruder provided with multiple blowing agent inlets along the length of the barrel, selection of an orifice further downstream from the polymer inlet will serve to reduce the loss rate at otherwise unchanged conditions.

A small, controlled rate of leakage of blowing agent upstream from the injection point may be desired to remove gas which is entrained in the polymer powder column and which might have undesired effects in the production of foamed polymer.

This invention is applicable to the production of foamed thermoplastic articles from any thermoplastic polymers which are convertible to foamed articles by extrusion of a homogeneous or substantially homogeneous melt comprising said polymer and a volatilizable fluid flowing agent from a zone of relatively high pressure and temperature into a zone of reduced pressure, and generally of reduced temperature, such as extrusion into the atmosphere.

The invention is generally applicable to those polymers disclosed as suitable in the practice of the inventions of the above-mentioned Dygert et al. and Overcashier et al., patents, including, for example, crystallizable linear polymers of alpha mono-olefins having from 2 to 8 carbon atoms such as polyethylene or polypropylene, certain polycarbonates, cellulose derivatives, nylons, polymers of styrene and substituted styrenes, acrylates, polyvinyl chloride, and the like.

This invention is of special advantage in the production and extrusion of foamable mixtures of polymers which are subject to thermal degradation at the conditions of temperature and residence time required for conversion to a melt in a screw extruder according to methods known to the art. By providing a method for homogeneously distributing the blowing agent in the unmelted polymer composition this invention permits the residence time of polymer melt in the extruder to be reduced and also generally permits the melt to be processed at a low temperature since the blowing agent-containing melt generally will have a substantially low viscosity at a given temperature than the polymer composition without blowing agent. This invention is thus of special advantage in the extrusion of foamable melts of polyvinyl chloride and of polyolefins of extremely high molecular weight, e.g., polyethylene or polypropylene of one to two million viscosity average molecular weight.

The polymer feed for use in this invention must be in the form of powder or finely divided particles. The invention is therefore particularly adapted for use with those polymer products which are available commercially in such finely divided form. The polymer feed may comprise individual particles or agglomerates of two or more particles sticking together. Individual particles are preferably between 0.5 and 10 microns in diameter, but may range up to as large as 300 microns. The average size of particles which are agglomerates of two or more individual particles sticking together is generally not in excess of about 1000 microns.

In the production of foamed thermoplastics of uniform composition having relatively small foam cells it is usually desirable to incorporate a separate foam nucleating agent in the polymer composition. A variety of useful foam nucleating agents are known, including, for example, inert solid materials such as silicates, heat-decomposable solid organic compounds such as those which are themselves effective when used as blowing agents in larger amounts, e.g., azodicarbonamide, combinations of sodium bicarbonate and critric acid, and the like. When such solid foam nucleating agents are used they are preferably admixed with the finely divided thermoplastic material prior to its being charged to the extruder or incorporated in the plastic composition.

Nucleation of the foam may also be provided by incompatible blowing agents, such as explained in said Overcashier et al., patent, or by inclusion of a small amount of inert gas, such as nitrogen or carbon dioxide, in the polymer melt.

Other materials may also be included in the polymer composition or separately admixed with the polymer particles, such as, for example, finely divided pigments, finely divided particles of asphaltic materials, plasticizers, dyes and the like, depending upon the intended use of the finished product.

The thermoplastic composition which is charged to the extruder may consist essentially of a single thermoplastic resin or it may comprise a blend of thermoplastic resins or a blend of thermoplastic resins containing minor amounts of other components such as elastomers, various known stabilizers, dyes, and the like.

The blowing agents used in the process of this invention are characterized by (1) being in the liquid phase or in a high-density, super-critical state at a density in excess of 1 pound per cubic foot at the temperature and pressure prevailing in the compacted thermoplastic polymer mass at the point at which the blowing agent is injected; and (2) volatilizing at the temperature and pressure selected for carrying out expansion of the polymer mass.

The volatilizable blowing agents suitable for use in this invention are generally selected from those which are soluble in the polymer melt in the extruder. A large variety of such blowing agents are known to the art. Many of them are enumerated, for example, in said Dygert et al., patent. A preferred group are paraffinic hydrocarbons of 4 to 6 carbon atoms per molecule. The invention is also applicable to the use of blowing agents which are not soluble in the polymer mass, exemplified by those illustrated and enumerated in the said Overcashier et al. patent. Water is a preferred blowing agent of the latter type. The blowing agents enumerated and described in said patents are useful in the practice of this invention.

The amount of the above-described components to be used in the process of the invention will vary over a wide range.

The blowing agent may be employed in a concentration from about 0.1 to 60% by weight of the thermoplastic polymer material. Volatile immiscible blowing agents are suitably employed in amounts in the range from about 0.5 to 40% by weight of the thermoplastic material and volatile miscible blowing agents in the range from 0.2 to 30%. In general, the preferred ranges provide 0.001 to 0.003 pound moles of blowing agent per pound of polymer.

The amount of solid foam nucleating agent, if used, may vary from about 0.01 to 5% by weight of the polymer, preferably in the range from 0.1 to 3% by weight of the thermoplastic material.

The essential and novel aspect of this invention consists in the charging of volatilizable blowing agent into a moving compact mass of finely divided solid polymer particles having a substantial void faction, sufficiently downstream from a polymer compacting means such as a feeder crammer or the initial compression section of an extruder to prevent substantial amounts of blowing agent charged to the polymer mass from discharging into the uncompacted polymer mass and being lost from the system.

Suitable methods and equipment for producing foamable or foamed solid thermoplastic articles from the resulting melts of thermoplastic polymer material and volatilizable foaming agent are known, as well as being described in the preferred embodiments of the present specification. The known methods, such as those described in detail in said Dygert et al. and Overcashier et al. patents, can be employed for converting melts produced according to the present invention to foamed or foamable solid articles.

It has been found in a study of the pressure and flow relationships of a system of compacted powder particles and fluid, such as polymer and blowing agent, that the "leak rate," i.e., the rate at which fluid flows through the compacted mass at laminar flow coniditions under a fixed pressure differential, is proportional to a large inverse power of the void fraction. The power is in the range from $-6$ to $-9$. Hence, when the void fraction of a mass of fine particles is reduced by a factor of two, say from 0.6 to 0.3, the leak rate is reduced to a value between about a 60th and a 500th of the value at the higher void fraction. The present invention takes advantage of this relationship.

It will now be evident that in any given system of polymer powder and blowing agent the rate of blowing agent leakage from the injection point to the uncompacted feed is controlled primarily by the length of the column of compacted polymer, by the void fraction therein, and by the initial pressure of the blowing agent. The pressure required for injecting the blowing agent into the compacted polymer mass is controlled primarily by the pressure prevailing in the mass and by the void fraction at the injection point, being higher for lower void fractions.

In the practice of this invention it is generally desired to operate the process such that the least practical amount of blowing agent penetrates back to the uncompacted powder feed, consistent with reasonable operating conditions, including a reasonable blowing agent injection pressure. The leakage rate may be between 0 and 10% and is preferably held below 3% of the amount charged.

One method of achieving the desired balance of conditions is to compress the powder mass only moderately, say to a void fraction of 0.6, and provide a rather long column of the compacted mass upstream from the point of blowing agent injection. This is generally not a desirable configuration. The greatest convenient compression, say to a void fraction close to 0.2, will provide the greatest resistance to blowing agent leakage at the shortest column length. This has the disadvantage of requiring high pressure for blowing agent injection. The advantage of the low leakage rate at high compression can be combined with the advantage of lower injection pressure accruing from a high void fraction by operating under conditions such as illustrated in FIG. 3, in which the powder mass is compacted to a low void fraction and then partly decompressed before blowing agent is injected. Since the unmelted particles exhibit a semi-elastic behavior, the void fraction increases significantly when the system volume is increased.

In an example illustrative of one mode of practicing this invention, polypropylene foam is prepared in an apparatus essentially like that illustrated in FIG. 2 of the drawing. The feed is powdered polypropylene having an intrinsic viscosity of 2.3 dl./g., measured in decalin at 150° C., and having an average particle diameter of about 80 microns. The feed hopper may be pressured to a low pressure, from 10 to 25 p.s.i.g., with nitrogen to prevent blow-back of polymer if the rate of blowing agent leakage should temporarily become excessive, but this is not required in steady operation. The blowing agent is liquid isobutane, pumped into the feed transport section of the extruder. The liquid is pumped to a pressure in the range from 1000 to 3000 p.s.i. by a diaphragm pump and then passed through a back-pressure regulator. It is charged at a rate of 7–10 phr.

The extruder is a 1 inch single screw 17 L/D extruder; the screw has a feed section of 4 L/D, compression section of 9 L/D and metering section of 4 L/D. The compression ratio is 2.4. Blowing agent is injected into the feed section at a point 2.5 L/D downstream from the point at which compacted feed enters the barrel. In steady operation of this system, foamed polypropylene having excellent properties is produced. Operation can be facilitated by providing a screw having a longer feed transport section, e.g., 8 L/D and injecting blowing agent into the transport section further downstream from the polymer feed point, e.g., about 5 L/D.

We claim as our invention:

1. A continuous process for preparing and extruding an expandable thermoplastic composition comprising a thermoplastic polymer and a blowing agent which is substantially insoluble in the liquid phase of said polymer and which vaporizes at the conditions at which said thermoplastic composition is expanded, said process comprising the steps of
   (a) continuously feeding a mass of finely divided solid particles of said polymer into an extruder,
   (b) at a point in said extruder wherein the void fraction in said mass has been reduced by compression of said mass to a value in the range from 0.6 to 0.2 while said particles are still solid, injecting said blowing agent in liquid phase into said compressed mass,
   (c) applying pressure, heat and agitation to the resulting mixture so as to melt the polymer while maintaining said blowing agent distributed in the resulting melt in the form of substantially uniformly distributed finely divided discrete liquid masses while advancing said melt through said extruder, and
   (d) extruding the resulting mixture.

2. A continuous process for preparing and extruding an expandable thermoplastic composition comprising a thermoplastic polymer and a volatilizable fluid blowing agent, said process comprising the steps of
   (a) gradually compressing a mass of finely divided solid particles of said thermoplastic composition,
   (b) forwarding said mass toward the die orifice of a pressure resistant screw extruder,
   (c) injecting said blowing agent into said moving mass of solid particles after said mass has been compressed to retain a void fraction of no more than 0.6, the void fraction at the point of injection being in the range from 0.6 to 0.2,
   (d) melting the resulting mixture in said extruder while it is being forwarded toward the die orifice, and
   (e) extruding the resulting melt through said die orifice.

3. A process according to claim 1 wherein said mass of finely divided particles is compressed by a compressive feeding means to a void fraction of no more than about 0.6 and continuously charged to the extruder entry port as a moving compressed mass of solid particles.

4. A process according to claim 1 wherein said mass of finely divided particles is in a compressed condition, having a void fraction in the range from 0.6 to 0.2, in a zone downstream from the feed entry port of said extruder and it thereafter decompressed in said extruder to a higher void fraction, said blowing agent being injected into the mass while it is in said decompressed condition.

5. A process according to claim 1 in which said blowing agent is a paraffinic hydrocarbon of up to 6 carbon atoms per molecule, introduced into the extruder via liquid phase.

6. A process according to claim 2 wherein said polymer is isotactic polypropylene and said blowing agent is water.

References Cited
UNITED STATES PATENTS

| | | | |
|---|---|---|---|
| 2,354,260 | 7/1944 | Haney et al. | 264—53 |
| 3,177,164 | 4/1965 | Mills et al. | 260—2.5 |
| 3,214,234 | 10/1965 | Bottomley | 264—54 XR |
| 3,310,617 | 3/1967 | Dygert et al. | 264—53 |

PHILIP E. ANDERSON, Primary Examiner

U.S. Cl. X.R.

18—12; 260—2.5; 264—176